(12) United States Patent
Haller et al.

(10) Patent No.: US 12,017,562 B2
(45) Date of Patent: Jun. 25, 2024

(54) HEIGHT-ADJUSTABLE CONTROL LEVER CARRIER FOR A COMMERICAL VEHICLE SEAT

(71) Applicant: GRAMMER AG, Ursensollen (DE)

(72) Inventors: Erwin Haller, Birgland (DE); Konstantin Krivenkov, Amberg (DE)

(73) Assignee: GRAMMER AG, Ursensollen (DE)

( * ) Notice: Subject to any disclaimer, the term of this patent is extended or adjusted under 35 U.S.C. 154(b) by 297 days.

(21) Appl. No.: 17/544,376

(22) Filed: Dec. 7, 2021

(65) Prior Publication Data
US 2022/0194267 A1 Jun. 23, 2022

(30) Foreign Application Priority Data
Dec. 23, 2020 (DE) .................. 102020134877.0

(51) Int. Cl.
| | | |
|---|---|---|
| B60N 2/16 | (2006.01) | |
| B60N 2/02 | (2006.01) | |
| B60N 2/75 | (2018.01) | |
| G05G 1/04 | (2006.01) | |
| G05G 25/00 | (2006.01) | |

(52) U.S. Cl.
CPC ........... B60N 2/161 (2013.01); B60N 2/0228 (2013.01); B60N 2/77 (2018.02); B60N 2/773 (2018.02); B60N 2/797 (2018.02); G05G 25/00 (2013.01); G05G 1/04 (2013.01)

(58) Field of Classification Search
CPC .......... B60N 2/797; B60N 2/161; B60N 2/77; B60N 2/773; B60N 2/38; B60N 2/0228; G05G 25/00; G05G 1/04
See application file for complete search history.

(56) References Cited

U.S. PATENT DOCUMENTS

| | | | | |
|---|---|---|---|---|
| 4,222,543 A | | 9/1980 | Gedig et al. | |
| 5,458,399 A | * | 10/1995 | Gezari | B60N 2/797 |
| | | | | 297/423.26 |
| 5,924,515 A | * | 7/1999 | Stauffer | A01D 67/04 |
| | | | | 180/326 |

(Continued)

FOREIGN PATENT DOCUMENTS

| | | |
|---|---|---|
| CN | 105620323 | 6/2016 |
| DE | 3825124 | 10/1990 |
| DE | 4342016 | 6/1995 |

(Continued)

OTHER PUBLICATIONS

Official Action with Machine Translation for European Patent Application No. 21214762.3, dated Nov. 20, 2023, 11 pages.

(Continued)

Primary Examiner — Milton Nelson, Jr.
(74) Attorney, Agent, or Firm — Sheridan Ross P.C.

(57) ABSTRACT

The invention relates to a height-adjustable control lever carrier for a commercial vehicle seat, which carrier is at least partially arranged to the side of a seat part, wherein the control lever carrier is provided for receiving at least one control lever for controlling vehicle equipment and at least one armrest, and is characterised in that the control lever carrier comprises a multi-joint mechanism construction, by means of which the control lever carrier is adjustable both in a seat height direction and in a seat longitudinal direction relative to the seat part.

8 Claims, 15 Drawing Sheets

(56) References Cited

U.S. PATENT DOCUMENTS

| | | | | |
|---|---|---|---|---|
| 8,388,262 B2* | 3/2013 | Klein | ................... | B60N 2/797 |
| | | | | 404/83 |
| 2010/0187858 A1* | 7/2010 | Ekren | ................... | B60N 2/773 |
| | | | | 296/190.01 |

FOREIGN PATENT DOCUMENTS

| | | | | |
|---|---|---|---|---|
| DE | 19701388 | 7/1998 | | |
| DE | 102010013041 | 9/2011 | | |
| GB | 2007497 | 5/1979 | | |
| KR | 10-2015-0130710 | 11/2015 | | |
| WO | WO-2019242941 A1 * | 12/2019 | ............. | B60N 2/753 |

OTHER PUBLICATIONS

Extended Search Report for European Patent Application No. 21214762.3, dated May 17, 2022, 9 pages.
Official Action for German Patent Application No. 102020134877.0, dated May 27, 2021, 4 pages.
Official Action with English Translation for China Patent Application No. 202111516993.4, dated May 24, 2023, 9 pages.

* cited by examiner

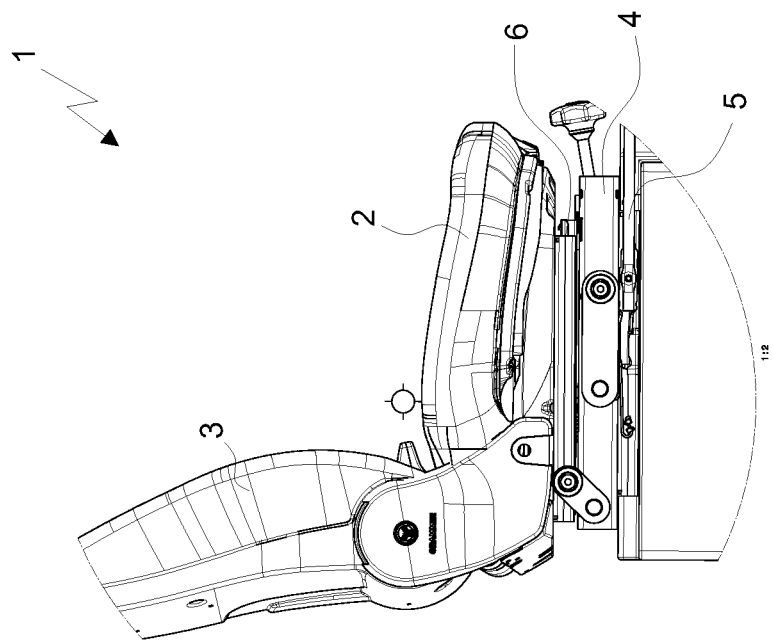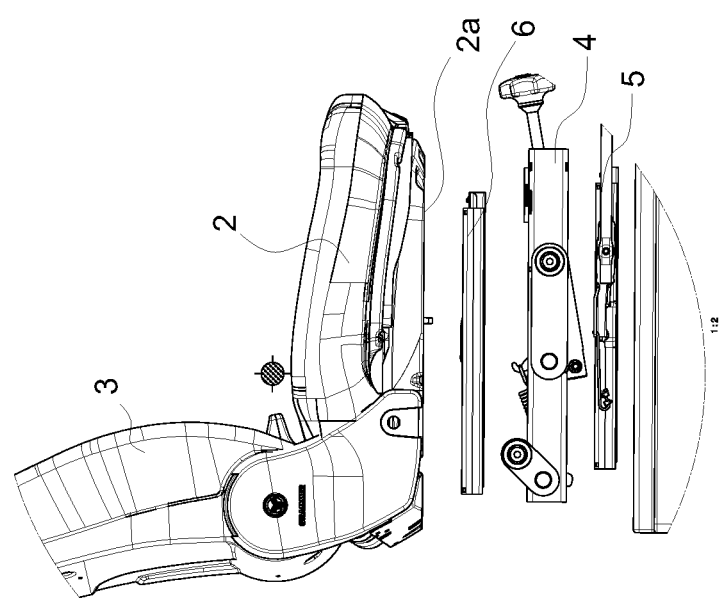
Fig. 1  Prior art

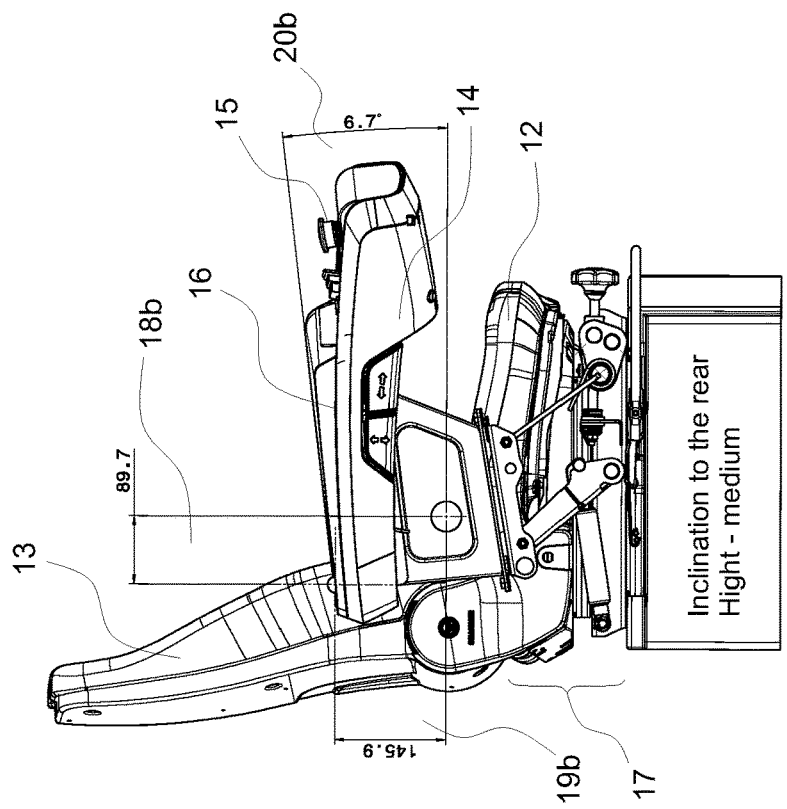
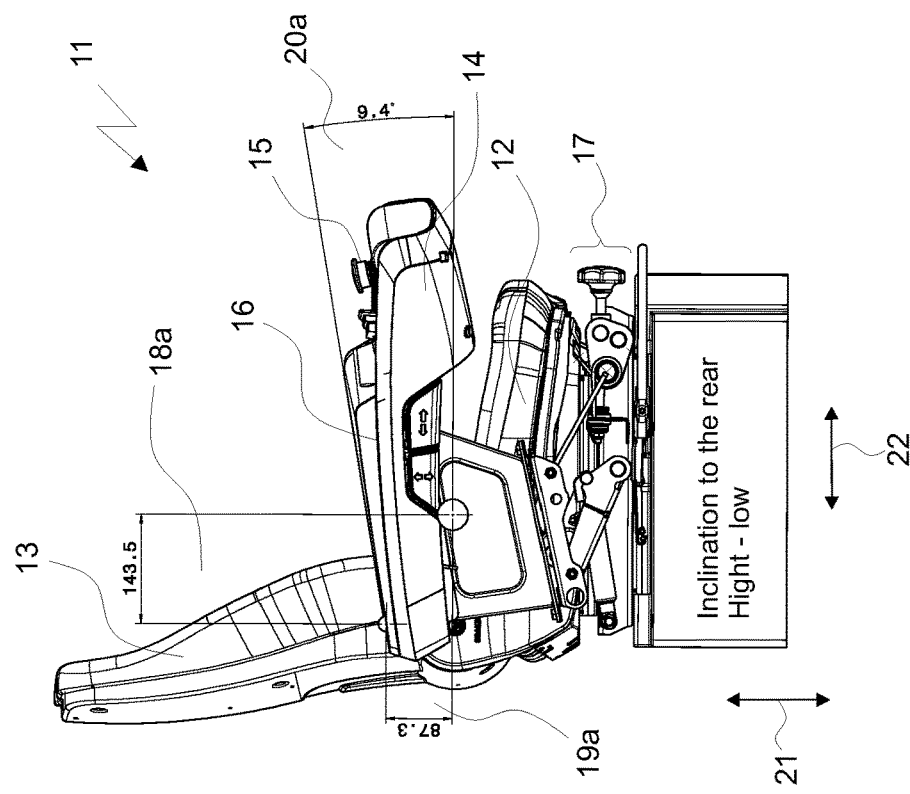
Fig. 2b
Fig. 2a

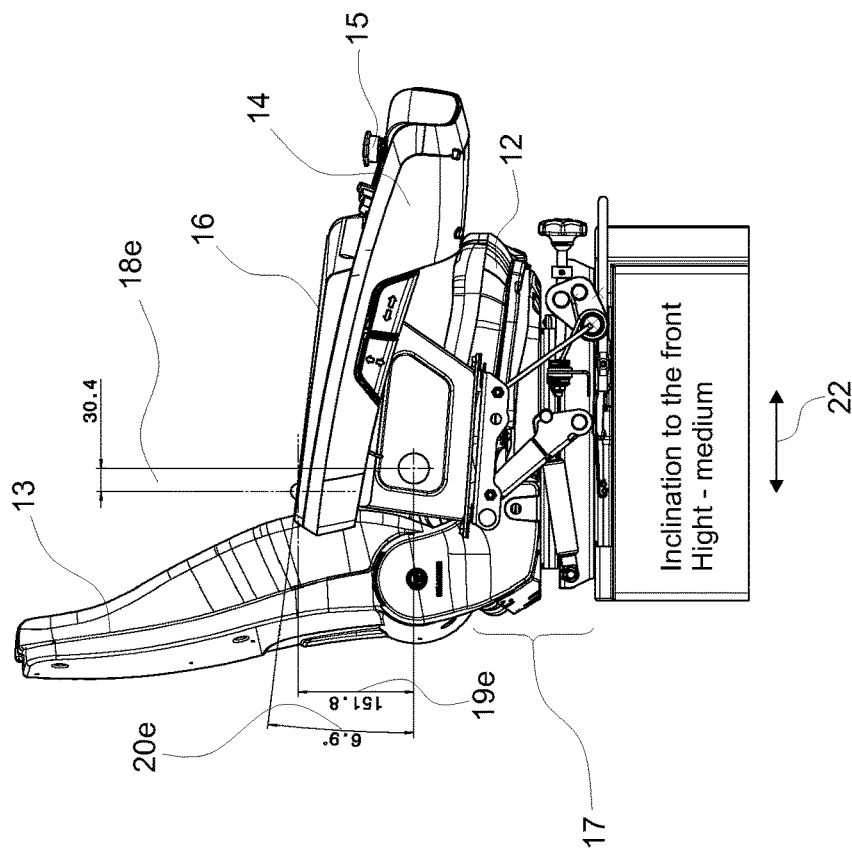
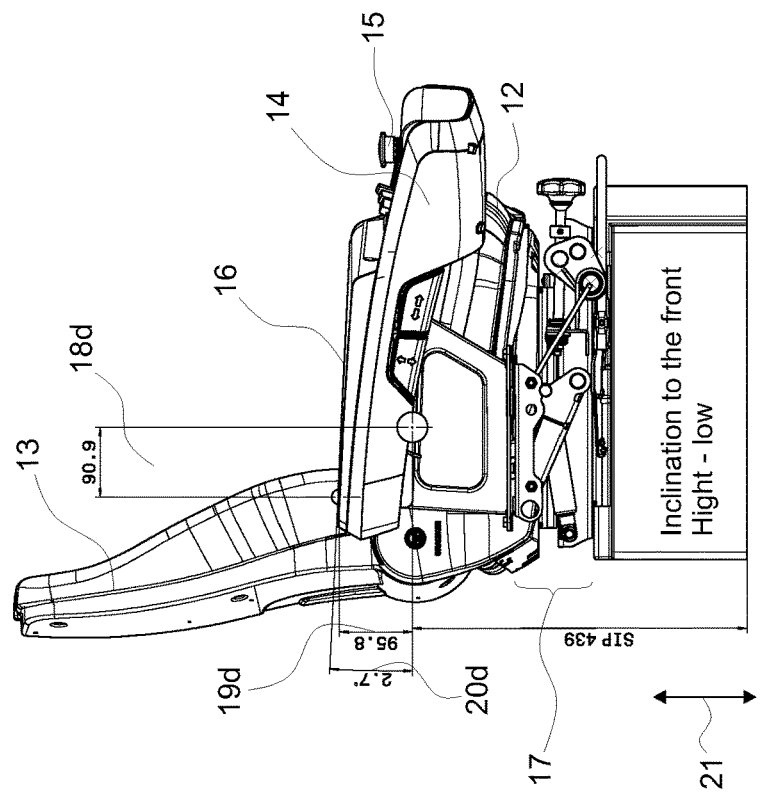
Fig. 3b
Fig. 3a

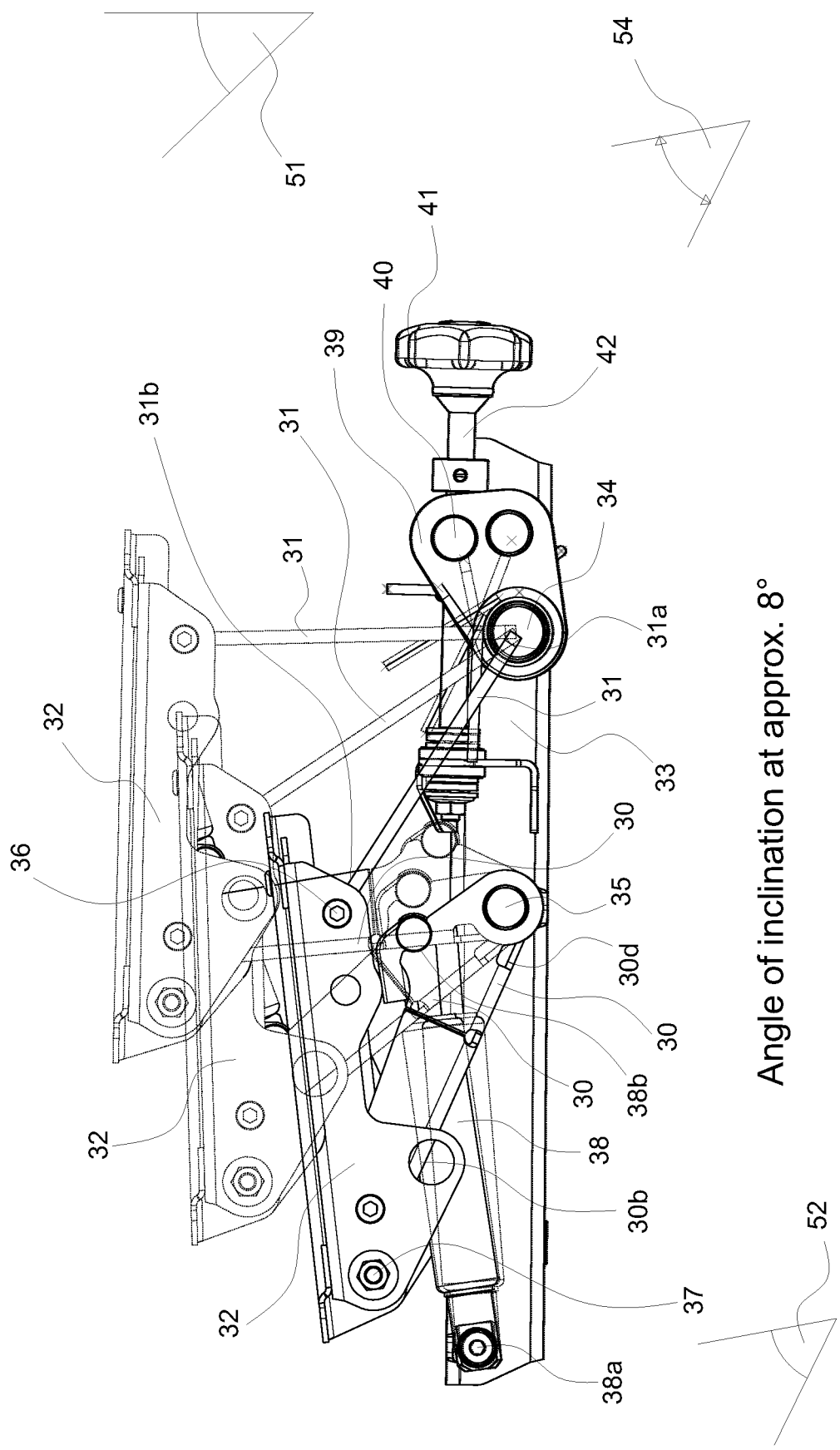

Hight - medium
Inclination central

Hight - medium
Inclination to the rear

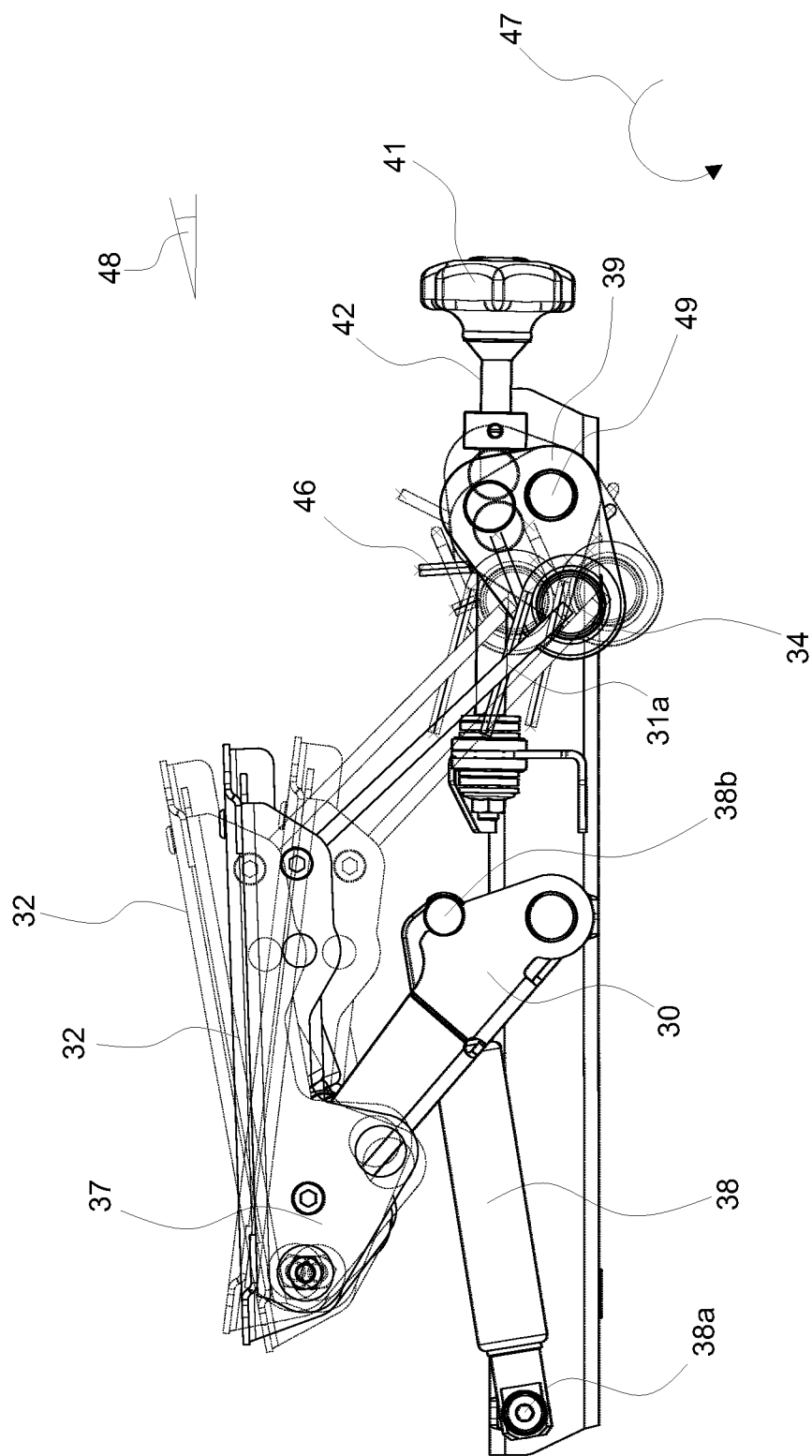
Fig. 9    Inclination adjustment at Hight - medium

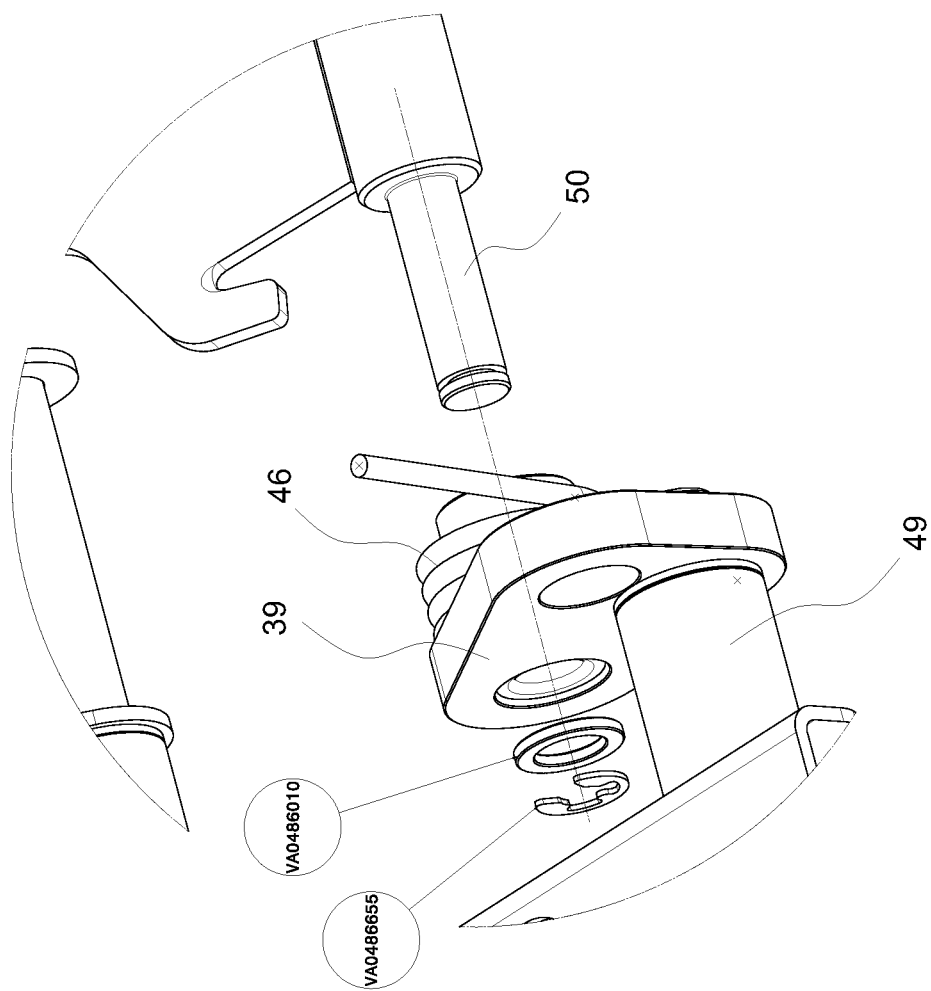

HEIGHT-ADJUSTABLE CONTROL LEVER CARRIER FOR A COMMERICAL VEHICLE SEAT

CROSS-REFERENCE TO RELATED APPLICATION

This application claims the benefit of German Patent Application No. 10 2020 134 877.0 filed Dec. 23, 2020, the contents of which are incorporated herein by reference in its entirety.

FIELD

The invention relates to a height-adjustable control lever carrier for a commercial vehicle seat, which carrier is at least partially arranged to the side of a seat part, according to the preamble of claim 1.

BACKGROUND

In construction machinery vehicles, forklift trucks or various other agricultural vehicles such as tractors, combine harvesters, etc., the commercial vehicle seats are often equipped with control levers that are used to control various pieces of vehicle equipment. Control levers of this type can be, for example, joysticks, drive levers or other operating elements, which are usually arranged in the front region of an armrest.

Control levers of this type are housed together with an armrest and various other devices in a control lever box, which is present as a module of a driver's seat with the aid of a control lever carrier. A control lever carrier of this type is usually attached to the side of the seat part in a slightly elevated way such that the driver can rest his arm on the control lever box arranged thereon.

Since the users of commercial vehicle seats of this type are often of different heights, the body dimensions are also different from driver to driver. Control lever carriers therefore have to be adjustable in height. There are now various solutions for this, but these are associated with additional devices and effort, as described below:

Control lever carriers that can be adjusted in the height direction are known. A longitudinal adjustment, which is also absolutely necessary because people of different sizes also have forearms of different lengths and thus the distance between a control lever arranged in the front region of an armrest and the backrest may have to be changed, is changed in a different way. For example, the longitudinal adjustment of excavator seats is carried out with a control lever carrier by means of a total of two longitudinal adjustment devices in the form of pairs of rails. The first pair of rails is located between a seat suspension arranged on the underside and a base construction that extends below the seat and belongs to the control lever carrier. A second pair of rails is located between this base construction and the seat part above it.

The lower pair of rails is used to move the entire seat, including the control lever carrier, in the seat longitudinal direction relative to a body. The distance between the person and the steering wheel or the foot pedals can thus be adjusted.

The other pair of rails, namely the upper pair of rails, is used to make the longitudinal adjustment in the case of a height-adjusted control lever carrier such that the driver has an optimal distance from his SIP (seat index point) and the control lever. Thus, a plurality of adjustment devices have to be operated if a driver, due to his body size, wishes to change the dimensions of the control lever carrier for optimal operation of the control lever. In FIG. 1, a vehicle seat 1 according to the prior art is described. In this view, it can be seen that the vehicle seat with a seat part 2 and a backrest 3 on the underside 2a of the seat part has a further pair of rails 6 next to the already existing pair of rails 5, with a control lever carrier apparatus 4 being arranged between the two pairs of rails. This further pair of rails 6 is only used to optimally align the vehicle seat relative to the control lever carrier 4 in order to allow the driver, who has, for example, a substantially shorter or substantially longer forearm than the previous driver, to set a user-friendly position of the forearm on an armrest (not shown here) which is connected to the control lever carrier 4.

SUMMARY

Accordingly, it is the object of the invention to provide a height-adjustable control lever carrier for a commercial vehicle seat that does not require any further adjustment devices, such as a second pair of rails, and yet allows the driver to carry out an optimal height and distance adjustment when operating the control lever.

This object is achieved in accordance with the features of claim 1.

The key concept of the invention is that, in the case of a height-adjustable control lever carrier for a commercial vehicle seat, which carrier is at least partially arranged to the side of a seat part, wherein the control lever carrier is provided for receiving at least one control lever for controlling vehicle devices and at least one armrest, the control lever carrier comprises a multi-joint mechanism construction, by means of which it is adjustable both in a seat height direction and in a seat longitudinal direction relative to the seat part. If a multi-joint mechanism construction of this type, which can be designed as a four-joint mechanism construction, for example, is aligned in such a way that it allows a height adjustment in the seat height direction by pivoting individual struts that are connected to one another via this multi-joint mechanism, not only a height adjustment but also a longitudinal adjustment and even an inclination adjustment of the control lever carrier and thus of an armrest arranged on this carrier, as well as a control lever, can be achieved in the case of an optimal design of this multi-joint mechanism construction. In this case, the control lever carrier describes a kind of curved path during an adjustment and not exclusively an adjustment in the height direction or exclusively in the longitudinal direction. This is achieved in that, in the case of a four-joint mechanism construction of four struts connected in an articulated manner to form a square, the struts are connected in just such a way, the struts may be of different lengths, the struts may be moved in their pivot axis position, and the distance between the struts is also different and/or adjustable. The four struts are a front and a rear strut with regard to the seat longitudinal direction and an upper and a lower strut with regard to the seat height direction.

The front strut can be pivoted from a vertical alignment to the rear by a first angle about a first pivot axis at the lower first end thereof and the rear strut can be pivoted from a vertical alignment to the rear by a second angle about a second pivot axis at the lower second end thereof. This allows the control lever carrier to be pivoted to the rear and downwards together with the control box and thus together with at least one control lever and an armrest, the control lever carrier thereby running on a kind of curved path. This allows a smaller driver who would like to move the control lever carrier downwards together with the armrest to at the same time experience a rearward movement of the control lever carrier and thus to be presented with a shortened distance from the SIP or the backrest to the control lever located in front. Since smaller people also have a shorter forearm, this simultaneous adjustment in the longitudinal and height directions by changing the position of this four-joint mechanism construction is extremely advantageous. Conversely, taller people would experience an upward movement of the control lever carrier and a simultaneous forward movement of the armrest due to the tilting movement or pivoting movement described above.

The front strut can advantageously be pivoted from a vertical alignment to the rear by a first angle about a first pivot axis at the lower first end thereof. The rear strut can also be pivoted from a vertical alignment to the rear by a second angle about a second pivot axis at the lower second end thereof. In the case of two struts arranged in this way, this allows a quick rearward and thus downward movement of an upper strut of the four-joint mechanism construction, with the armrest or a control box and the control lever being attached to this upper strut.

The front and rear struts advantageously have different lengths. In this way, it can be achieved that at the same time as the downward pivoting or downward movement of the control lever carrier, an inclination takes place in the upper region of the control lever carrier, i.e. in the region of the upper strut, whereby the armrest inclines to the rear or to the front. This is quite desirable, since in the case of a downward and rearward movement of the control lever carrier, a smaller person may still wish to rest their elbow on the armrest in order to obtain the necessary comfort.

The positioning of the first pivot axis of the front strut can advantageously be changed in order to thereby achieve a change in the inclination of the control lever carrier. In this case, the first pivot axis is connected to a connecting rod component, for example, which can be pivoted about a first transverse axis using a control element and thus aligned in a different way. This allows the inclination in the upper region of the control lever carrier, i.e. in the region of the upper strut, to be changed to a greater extent in addition to an inclination adjustment that takes place in any case during an upward and downward movement of the control lever carrier, in order to achieve, for example, a desired inclination compensation in the front region of the control lever or to achieve a gain in the inclination adjustment with the upward and downward movement of the control lever carrier. This can also have the effect that, in the case of a height adjustment of the control lever carrier, a variation in the degree of inclination adjustment is obtained by presetting the inclination with a connecting rod component of this type.

According to a preferred embodiment, a variable-length actuator, such as a gas spring or a threaded spindle, is provided, with a first end on a base frame of the control lever carrier and with a second end on one of the struts for changing the first and second angle to thereby achieve a change in the position of the control lever carrier in the seat height direction and seat longitudinal direction. Thus, by extending and retracting the piston, a gas spring of this type is able to change the position of the four-joint mechanism construction overall, and thus to set the desired position of the control lever carrier both in the height and in the longitudinal direction.

The front and/or the rear strut is spring-loaded in the pivot direction of its pivoting movement by means of a spring element in order to allow a spring force to act against a gas spring and thus to bring about or at least support an independent raising of the four-joint mechanism construction, i.e. an independent upward movement of the armrest and thus the control lever carrier.

The four-joint mechanism construction is arranged on the left and right side of a seat part if a synchronised control lever carrier construction on both sides is desired. In this case, both four-joint mechanism constructions are connected to one another by means of transverse axes for a synchronous pivoting movement, these transverse axes and further base frame elements running below the seat part. An actuating element both on the left and on the right side can effect a simultaneous adjustment of the control lever carrier on both sides.

At least one control lever box, which contains both the armrest and various control elements, is arranged on the control lever carrier. This can be on one or both sides, i.e. on the left and right side.

BRIEF DESCRIPTION OF THE DRAWINGS

Further advantageous embodiments emerge from the following description in conjunction with the drawings, in which:

FIG. 1 shows a vehicle seat according to the prior art;

FIG. 2a-c are side views of a vehicle seat with different height settings of a control lever carrier, which is a control lever carrier inclined to the rear;

FIG. 3a-c are side views of the vehicle seat with different height settings of a control lever carrier inclined to the front;

FIG. 4 is a lateral detail view of sections of the control lever carrier in a side view and in different height positions;

FIG. 9 is a side view of sections of the control lever carrier in different inclination positions and FIG. 10 is a perspective exploded view of a section of a connecting rod component for adjusting the inclination adjustment of the control lever carrier according to the invention.

DETAILED DESCRIPTION

Figure 2C:
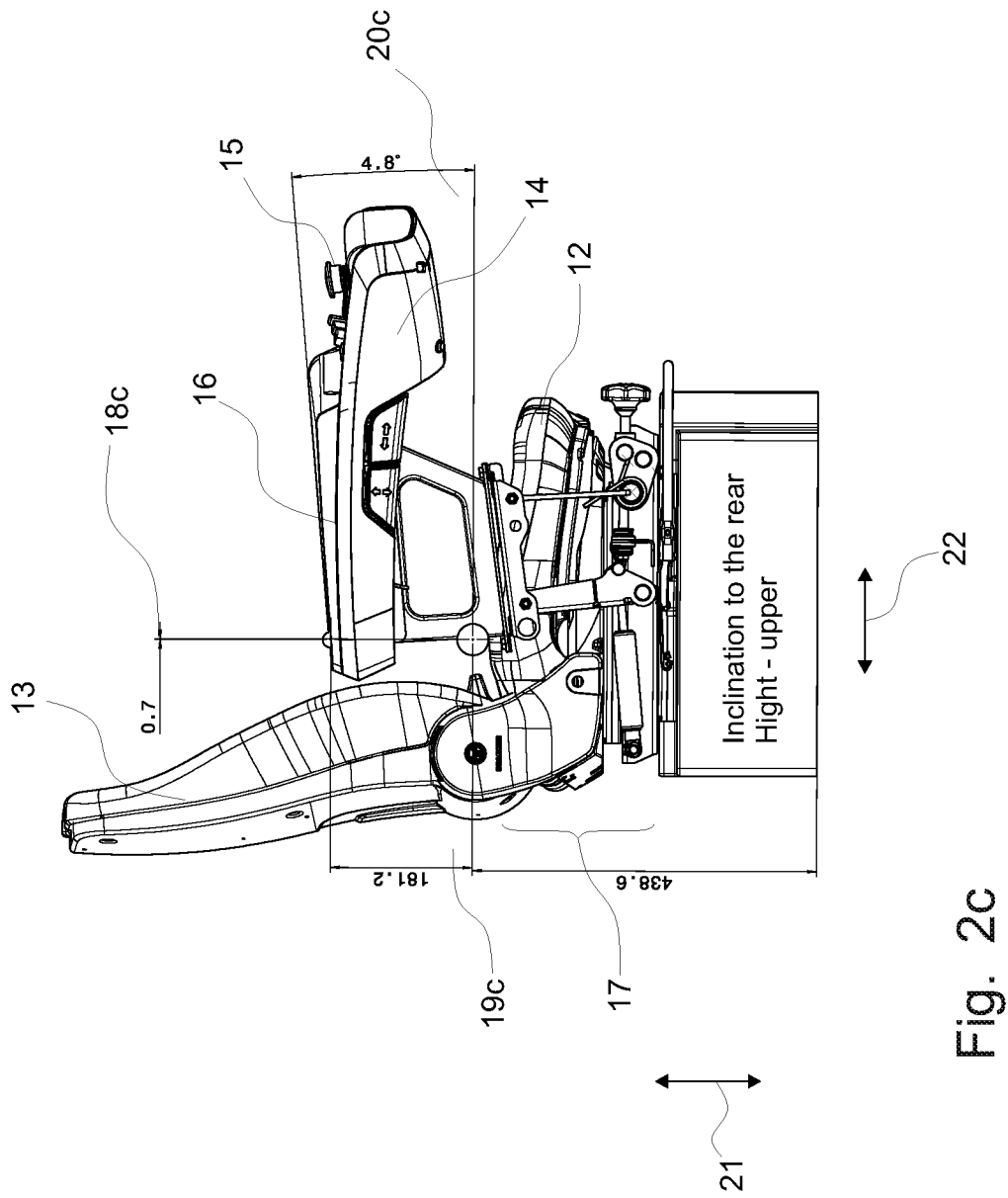

FIG. 2a-2c show different views of the vehicle seat according to the invention with the control lever carrier according to the invention at different height settings. In FIG. 2a, the vehicle seat 11 with a seat part 12 and a backrest 13 and a control box 14 and a control lever 15 and the armrest 16 is in a state in which the control lever carrier located in the portion 17 is located in a lower region. That means the control lever carrier has a low height setting. This can also be seen from the distance view 19a between a pivot point of the backrest 13 and the armrest 16.

By comparing FIGS. 2a, 2b and 2c, it can be seen that the height distance 19a, 19b and 19c increases. This means that the control lever carrier is moved upwards in the region 17. Thus, the control lever carrier has a medium height in FIG. 2b and an upper height in FIG. 2c.

It can also be seen from these views that the inclination of the armrest and thus of the control lever carrier is turned to the rear. This can be clearly seen by comparing the angle according to reference signs 20a, 20b and 20c.

At the same time, when comparing these figures, it can be seen that a distance 18a, 18b and 18c between the SIP and a rear region on the armrest 16, at which region e.g. the driver's elbow can be placed, decreases. This means that the control lever carrier together with the control console or the control box 14 also experiences a longitudinal displacement to the front with increasing height. Accordingly, in the case of the upward movement of the control lever carrier, the control lever carrier is moved to the front together with the control box 14 in the longitudinal direction 22. Reference sign 21 indicates the height direction of the movement of the control lever carrier.

Figure 3C:
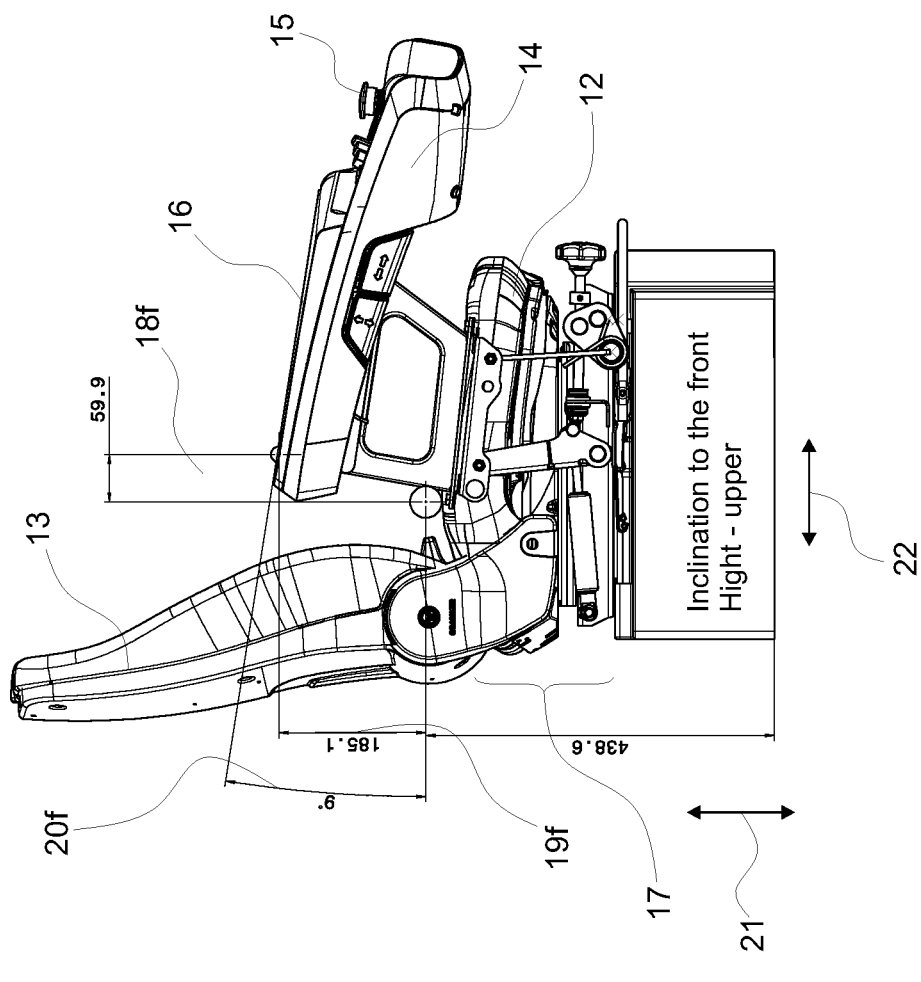

In FIGS. 3a, 3b and 3c the vehicle seat is shown again in a side view, and the control lever carrier in the region 17 is shown again in a lower height position (FIG. 3a), in a middle height position (FIG. 3b) and in an upper height position (FIG. 3c). In this case, however, the inclination setting of the control lever carrier and thus of the control box 14 and the armrest 16 is set such that the angle of inclination inclines to the front. This is illustrated by reference signs 20d, 20e and 20f.

Again, a change in the distance between where the elbow rests on the armrest 16 and the SIP can be clearly seen. This is illustrated by reference signs 18d, 18e and 18f. It can be clearly seen that, according to reference sign 18f, the left and right positions of the elbow rest and SIP are even interchanged in terms of their position.

According to reference signs 19d, 19e and 19f, the height difference can be recognised with increasing height adjustment of the control lever carrier. FIG. 4 is a detail view of the control lever carrier according to the invention in a side view in various positions in detail. This illustration shows that a first front strut 31 and a rear strut 30 are each arranged so as to be pivotable about a pivot point 34 and 35. This is done in such a way that both struts 31, 30 can be pivoted upwards into an almost vertical alignment and, the other way round, can be pivoted to the rear in order to move the control lever carrier into a lower position.

At the same time, there is an upper strut 32 which is designed as a receiving apparatus for the control box. It can be clearly seen in the course of the upper strut 32 in these three different positions that it undergoes not only a change in position in the height direction 21, but also a change in the longitudinal direction 22. At the same time, the inclination of the upper side of the upper strut 32 is changed. However, this can also be influenced by a connecting rod component 39, to be described in more detail later, with associated axes 40, a threaded spindle 42, and a knurled screw 41.

A lower strut 33 forms, together with the upper strut and the front and rear struts, a type of square, which, however, does not have equilateral edges. The lower strut 33 can at the same time be part of a base frame or a base construction, which will be shown in more detail later.

A lower end 30a of the rear strut 30 is fastened to the pivot axis 35 and is pivoted about this pivot axis. This becomes clear again from the angle view 52. An upper end 30b is connected to a further pivot axis 37, which in turn is connected to the upper strut.

A lower end 31a is connected to the pivot axis 34 and thus to the connecting rod component 39 and indirectly to the lower strut 33. The movement of the front strut 31 is illustrated by the angular range 51. A pivoting movement is to be shown with reference sign 54.

An upper end 31b of the front strut is connected to a pivot axis 36 and at the same time is in articulated contact with the upper strut 32.

A gas spring 38 is arranged such that the first end 38a thereof is fastened in an articulated or pivotable way to a base frame or, in this case, to the lower strut 33. The gas spring is connected with the second end 38b thereof to the rear strut 30 in order to allow the strut to pivot to the front and to the rear according to reference sign 54. This raises and lowers the four-joint mechanism construction and thus a height and longitudinal adjustment of the control lever carrier is effected.

Figure 5:
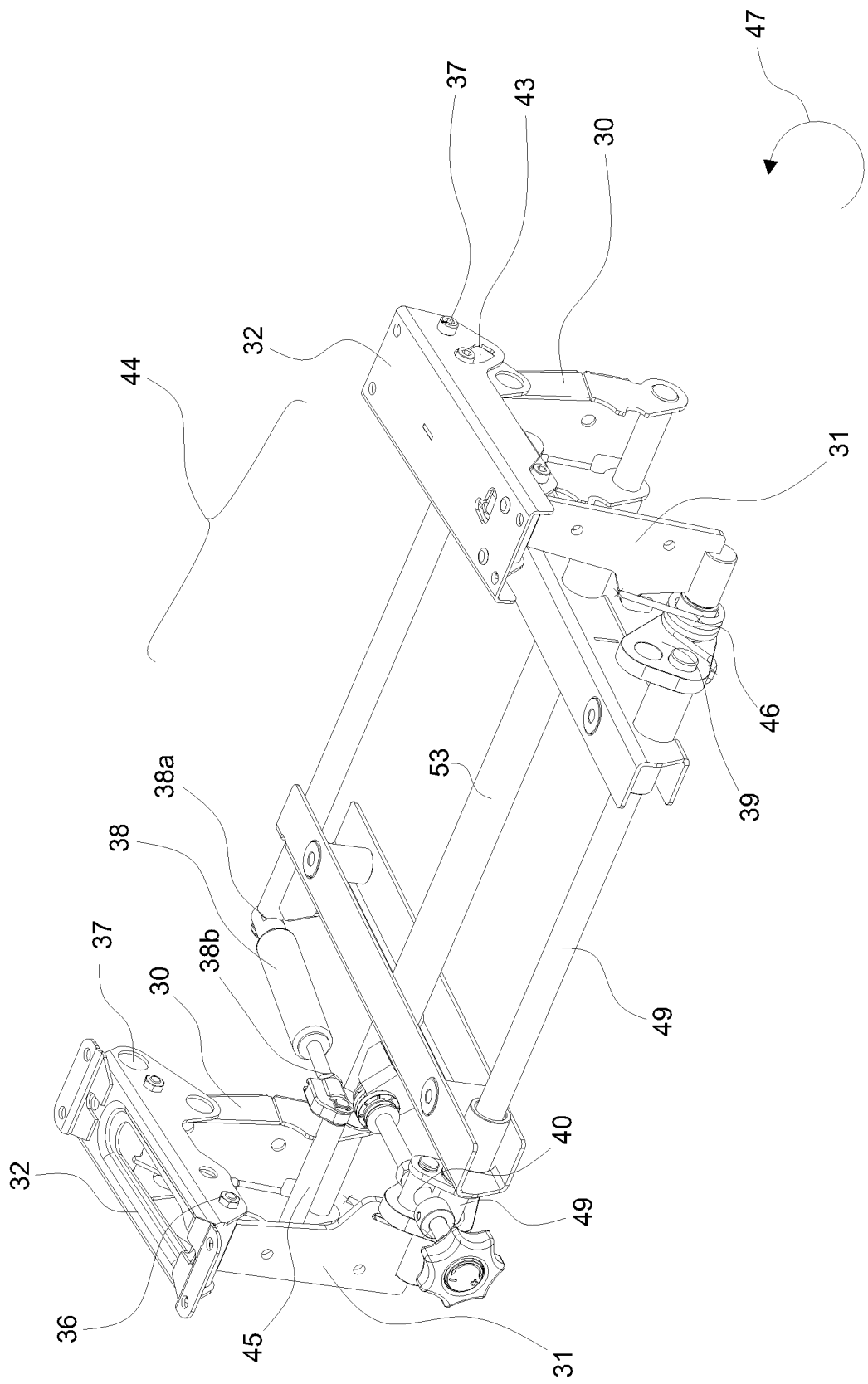
FIG. 5 is a perspective view of the entire control lever carrier apparatus with two height-adjustable control lever carriers on the left and right of a seat part (not shown here)

FIG. 5 shows the control lever carrier apparatus in a perspective view. The seat part and backrest are not shown, nor are further elements of the vehicle seat shown here. When two control lever carriers are present, i.e. on the left and right sides of a vehicle seat, it can be clearly seen from this view that a transverse connection is created via transverse axes 49, 53 and further component elements. The further components according to a base frame 44 serve not only to allow the two control lever carriers to move synchronously, but also to allow them to be fastened in or on the vehicle seat.

Components that are the same and have the same meaning are again provided with the same reference signs.

A transverse axis 49 serves to ensure the function of the connecting rod component 39, also in a synchronous manner. For this purpose, there is a pivoting movement 47 of the connecting rod component in order, for example, to change the position of the lower pivot point of the front strut 31 against the spring force of a spring device 46. This is shown more clearly in FIG. 9. In this case, in a side view, it can be seen that three different positions are possible with regard to the inclination setting by means of the connecting rod component 39. The strut 31 is arranged with the lower end 31a thereof on the pivot axis 34. This pivot axis is in turn connected to the connecting rod component 39, which can be rotated about a pivot axis or transverse axis 49. This is done by turning the threaded spindle 42 with a knurled screw 41, for example. As a result, pivoting of the connecting rod component 39 is achieved in the pivot direction 47 or counter to the pivot direction 47. The effect of this is that the positioning of the pivot axis 34 changes and thus an inclination of the upper strut 32 in the longitudinal direction takes place. This is intended to be represented by reference sign 48.

Figure 6B:
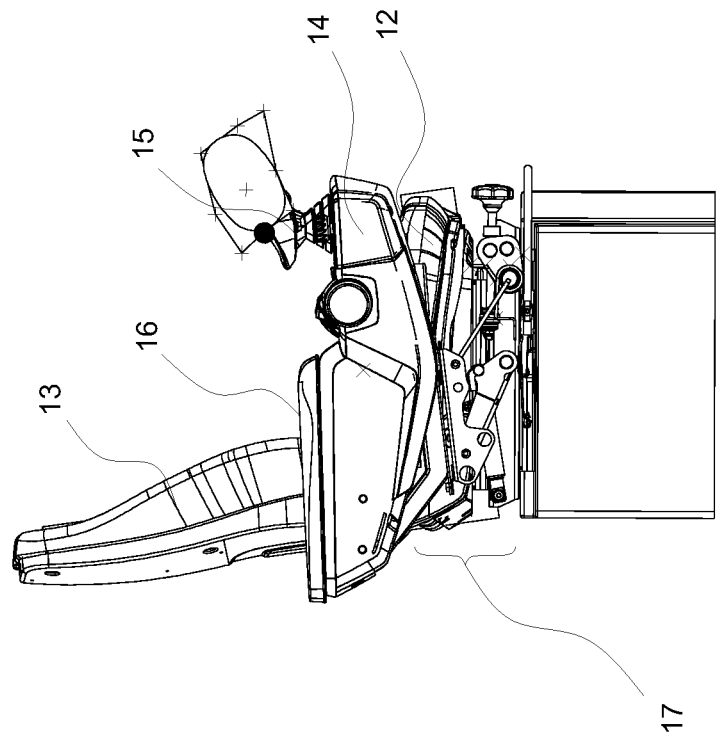
FIG. 6a-c are side views of the vehicle seat with a height adjustment in the lower region and various inclination adjustments of the control lever carrier.
Figure 6A:
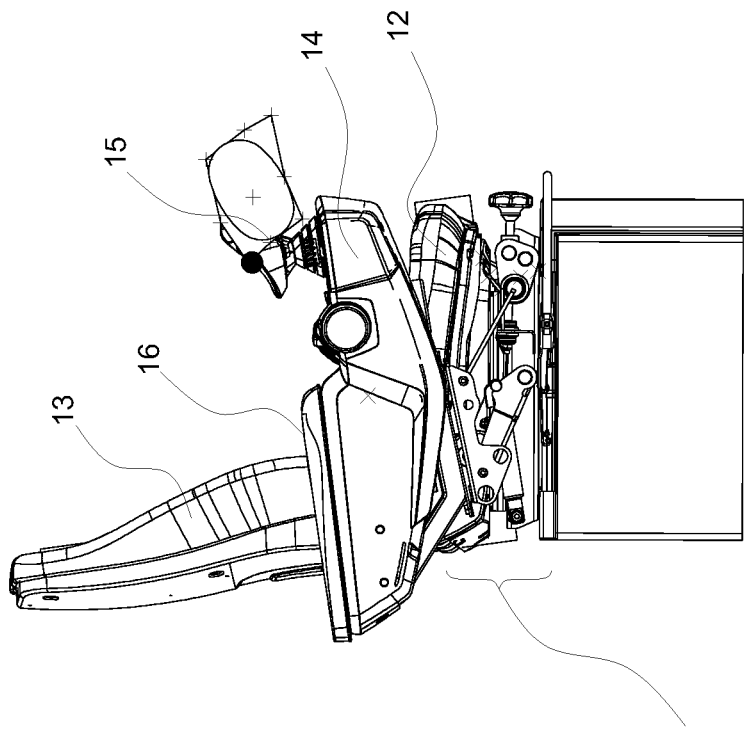
Figure 6C:
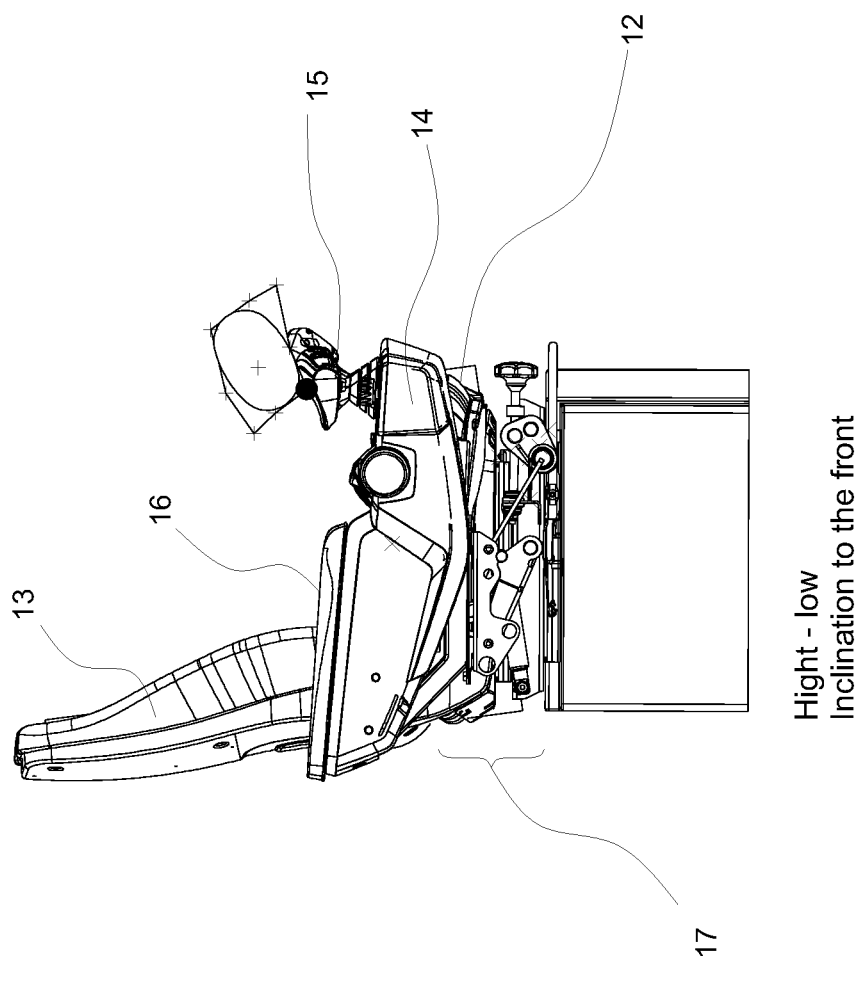

FIGS. 6a, 6b and 6c are side views of a vehicle seat with the control lever carrier according to the invention, in which the control lever carrier is located in a lower height setting and the inclination of the control lever carrier in the upper region of the armrest 16 is shown differently. FIG. 6a shows the inclination to the rear; FIG. 6b shows the inclination as being central; and FIG. 6c shows the inclination to the front.

The inclination setting takes place, for example, with a connecting rod component, as has been described in more detail in connection with FIG. 9.

It can be seen from this view that an advantageous work region for a person in the region of the control lever 15 can be set by adjusting the inclination.

Figure 7B:
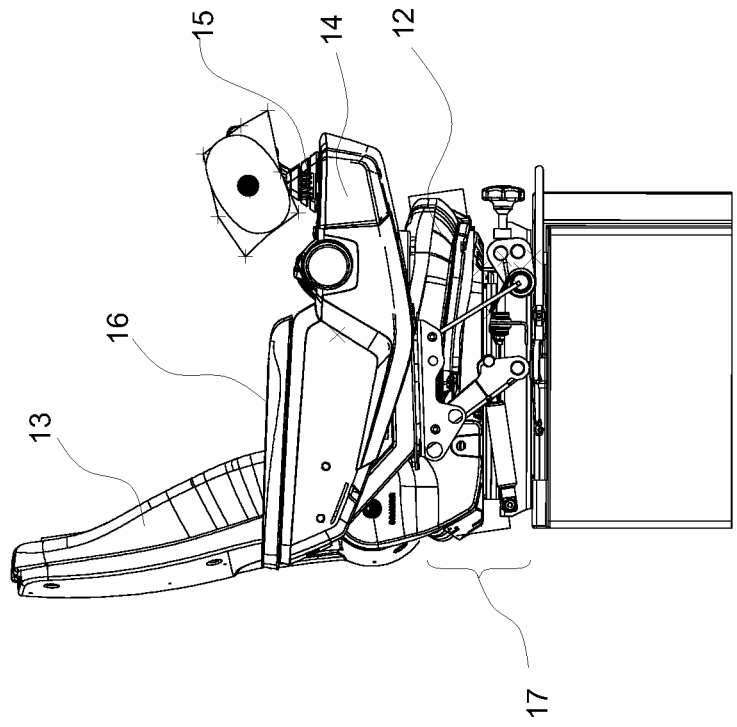
FIG. 7a-c are side views of the vehicle seat with a centrally arranged height adjustment of the control lever carrier and different control lever carrier inclinations.
Figure 7A:
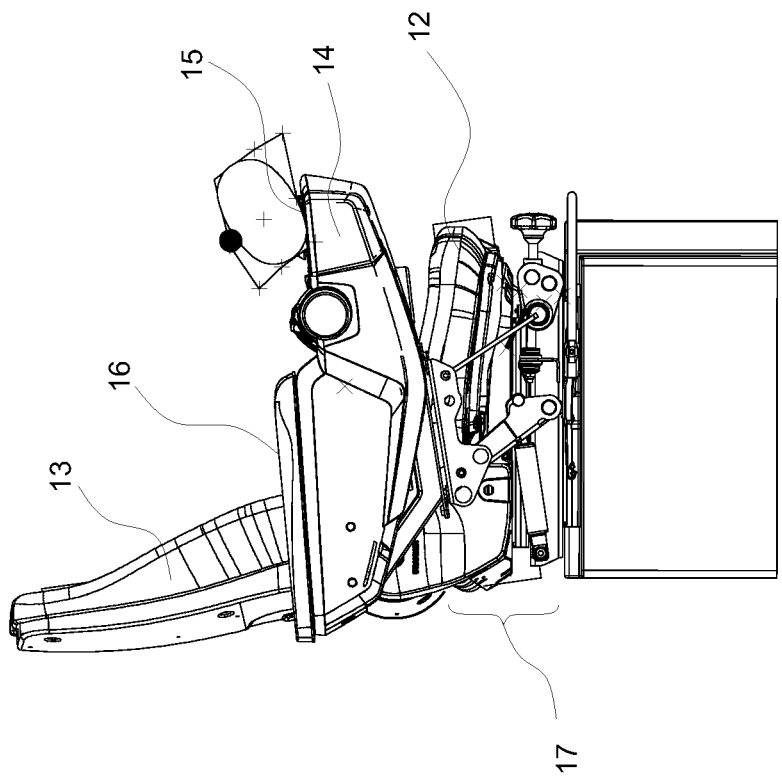
Figure 7C:
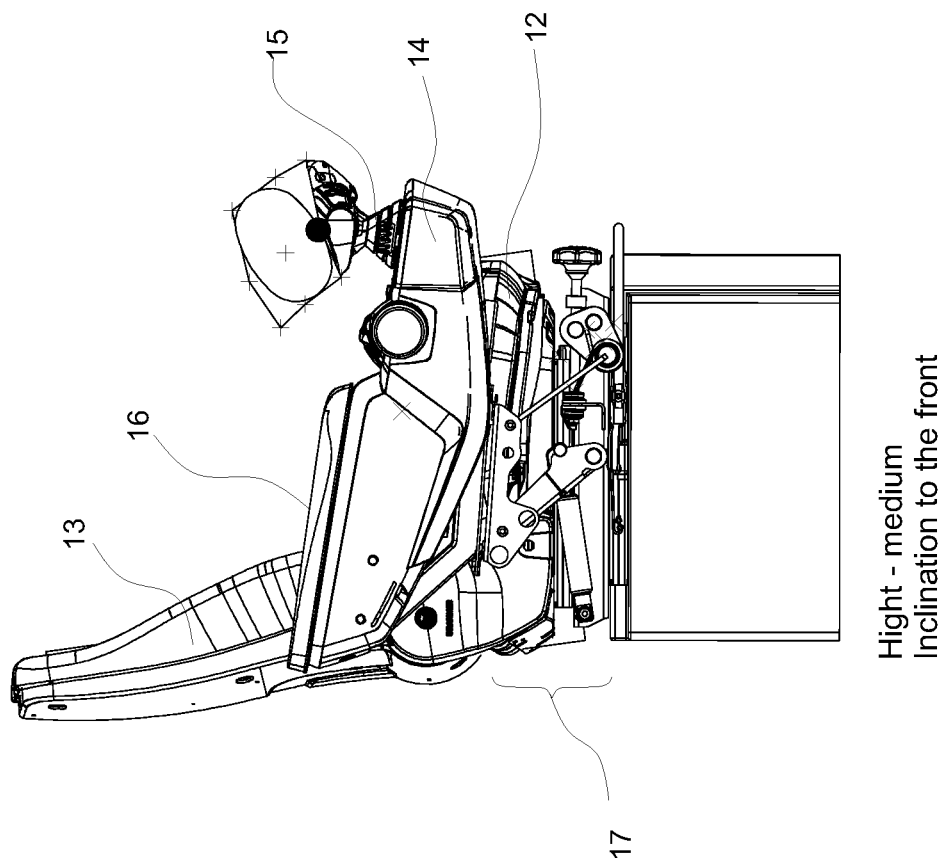
Figure 8B:
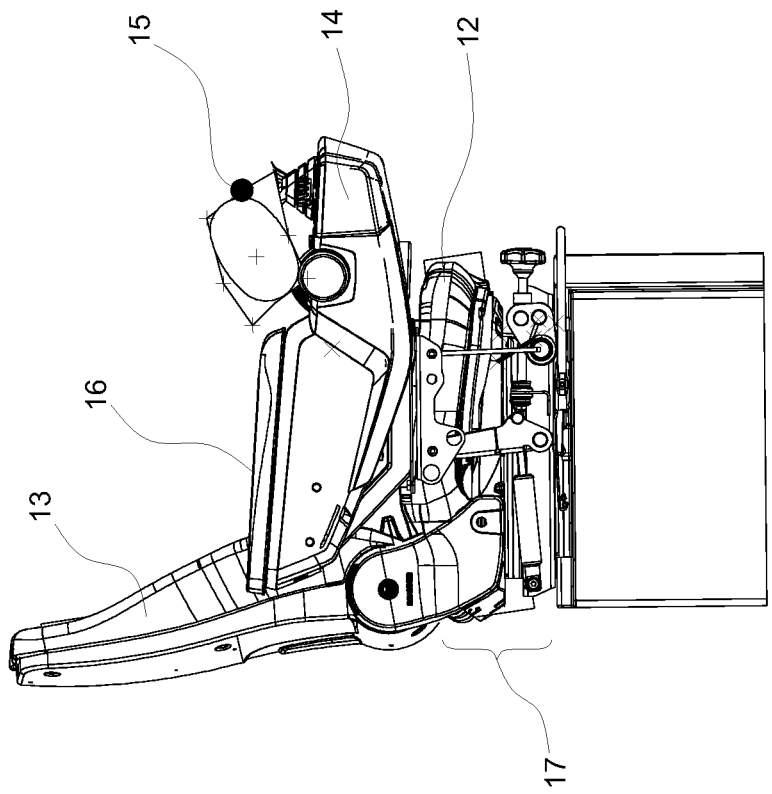
FIG. 8a-c are side views of the vehicle seat according to the invention with an upper height setting of the control lever carrier and different control lever carrier inclinations.
Figure 8A:
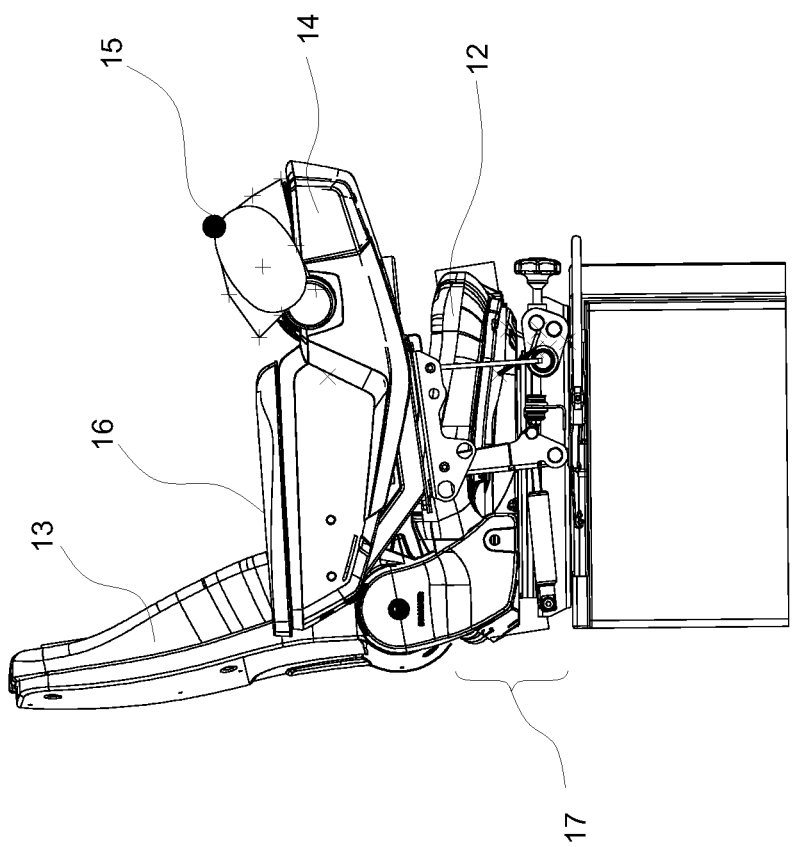
Figure 8C:
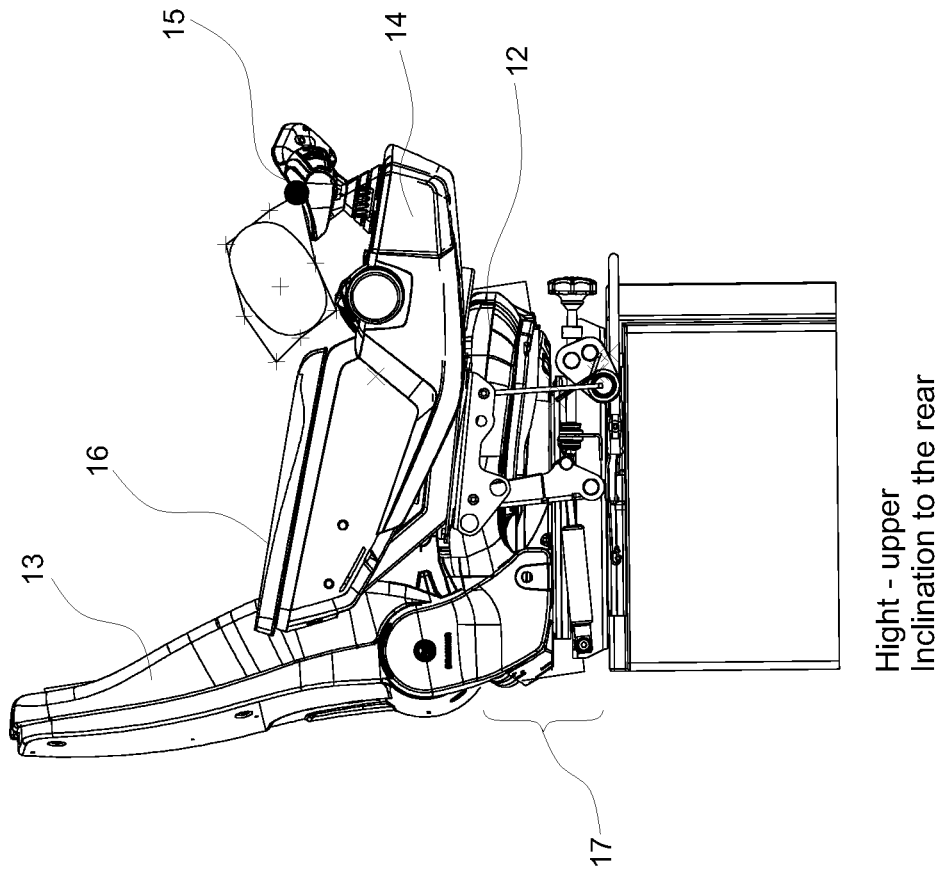

This becomes clear again if FIGS. 7a, 7b and 7c as well as 8a, 8b and 8c are compared therewith. These illustrations also show vehicle seats in side view, in which the control lever carrier is located in a middle height position in FIGS. 7a, 7b and 7c and in an upper height setting in FIGS. 8a, 8b and 8c. The inclinations are again shown differently, so that it becomes clear that increased seating comfort is achieved by resting the forearm on the armrest and subsequently adjusting the inclination.

FIG. 10 is an exploded view of the connecting rod component 39 with the associated spring device 46 in the form of a torsion spring and the transverse axis 49. Functional descriptions relating thereto have already been made in connection with FIG. 9.

The applicant reserves the right to claim all the features disclosed in the application documents as substantial to the invention, provided that these are novel, individually or in combination, over the prior art. It is further pointed out that features which in themselves can be advantageous have also been described in the individual drawings. A person skilled in the art will immediately recognise that a particular feature described in one drawing can also be advantageous without adopting further features from this drawing. Furthermore, a person skilled in the art will recognise that advantages can also result from a combination of a plurality of features shown in individual or in different drawings.

LIST OF REFERENCE SIGNS

1 Vehicle seat
2 Seat part
2a Underside
3 Backrest
4 Control lever carrier
5 Pair of rails
6 Pair of rails
11 Vehicle seat
12 Seat part
13 Backrest
14 Control box
15 Control lever
16 Armrest
17 Control lever carrier
19a-c Height distance
19d-f Height adjustment
20a-c Angle
20d-f Angle of inclination
21 Seat height direction
22 Seat longitudinal direction
30 Rear strut
31 Front strut
32 Upper strut
34 Pivot axis
35 Pivot axis
39 Connecting rod component
41 Knurled screw
42 Threaded spindle
44 Base frame
49 Transverse axis
51 Angle
52 Angle
53 Transverse axis

What is claimed is:

1. A height-adjustable control lever carrier for a commercial vehicle seat, which carrier is at least partially arranged to a side of a seat part, wherein the control lever carrier is provided for receiving at least one control lever for controlling vehicle equipment and at least one armrest,
wherein the control lever carrier comprises a multi joint mechanism construction, wherein the control lever carrier is adjustable both in a seat height direction and in a seat longitudinal direction relative to the seat part,
wherein the multi joint mechanism construction comprises a four-joint mechanism construction of four struts connected in an articulated manner to form a quadrilateral, namely a front strut and a rear strut with regard to the seat longitudinal direction and an upper and a lower strut with regard to the seat height direction, and
wherein the front strut can be pivoted from a vertical alignment to a rear by a first angle about a first pivot axis at a lower first end thereof and the rear strut can be pivoted from a vertical alignment to the rear by a second angle about a second pivot axis at a lower second end thereof.

2. The height-adjustable control lever carrier according to claim 1, wherein the four-joint mechanism construction is arranged on left and right sides of the seat part and both four-joint mechanism constructions are connected to one another by transverse axes for a synchronous pivoting movement.

3. The height-adjustable control lever carrier according to claim 1, wherein at least one control lever box is arranged on the control lever carrier.

4. The height-adjustable control lever carrier according to claim 1, wherein the front strut and the rear strut have different lengths.

5. The height-adjustable control lever carrier according to claim 1, wherein a positioning of the first pivot axis of the front strut can be changed in order to thereby achieve a change in an inclination of the control lever carrier.

6. The height-adjustable control lever carrier according to claim 5, wherein the first pivot axis is connected to a connecting rod component which can be pivoted about a first transverse axis using a control element and thus aligned in a different way.

7. The height-adjustable control lever carrier according to claim 1, wherein an actuator comprising at least one of a gas spring or a threaded spindle and is variable in its length is connected with a first end to a base frame of the control lever carrier and with a second end to one of the front strut and/or rear strut for changing the first and second angle to thereby achieve a change in a position of the control lever carrier in the seat height direction and in the seat longitudinal direction.

8. The height-adjustable control lever carrier according to claim 1, wherein the front strut and/or the rear strut are spring-loaded in the pivot direction of their pivoting movement by a spring element.

* * * * *